Patented Sept. 9, 1941

2,255,694

UNITED STATES PATENT OFFICE 2,255,694

DISINFECTANT COMPOSITION

Edward B. Beale, Rockville, Md.

No Drawing. Application October 12, 1937,
Serial No. 168,665

16 Claims. (Cl. 167—43)

This invention relates to disinfectant compositions. More particularly it relates to compositions for treating materials which are altered by water, such as leather, with water soluble agents capable of destroying bacteria or other infection producing organisms.

An object of the invention is to provide a water-containing composition for disinfecting leather which will contain ingredients for protecting the leather against the stiffening and cracking action of the water.

A further object of the invention is to provide an effective composition for disinfecting shoes which will not harmfully affect the leather of the shoes. In the treatment of various foot diseases, such as "Athlete's foot," use is commonly made of more or less effective treating agents which are applied to the feet. Ordinarily, however, the shoes of the sufferer are overlooked as a potent source of reinfection. Undoubtedly many an otherwise effective treatment of foot infections is frustrated by failure to take proper precautions in disinfecting the shoes. The compositions of the present invention are designed largely for such use.

The term "Athlete's foot" as used in this application refers to ringworm of the feet and is caused by various anaerobic fungi. These anaerobic fungus organisms penetrate the human skin and often enter through the cracks resulting from the drying out of the skin. Dampness and heat are conducive to the continued activity of these anaerobic fungi and they thrive in shoe leather under these conditions. When the human foot comes in contact with the infected shoe, the fungi readily enter the skin of the foot.

The composition of the present invention comprises an emulsion of a suitable oil with an aqueous solution of a suitable disinfectant. A water in oil or an oil in water emulsion may be employed, the latter being preferred.

Any emulsifiable oil which is absorbed by leather and has no deleterious effect thereon may be used. Thus animal and vegetable oils of the type commonly used for softening and waterproofing leather may be suitable. However, a mineral oil is preferred because of its greater stability in the presence of various disinfectant substances and its freedom from deterioration, and resulting rancidity, upon exposure to the air. A particularly suitable mineral oil is the petroleum product known as "soluble oil." This oil is a highly purified water white substance which can be easily beaten into an extremely stable emulsion with water or aqueous solutions.

A water solution of any water soluble substance which is known to have specific disinfectant properties for the particular organism it is desired to destroy or to have general disinfectant properties of a sufficiently powerful nature may serve as the active ingredient of the composition of this invention. The concentration of the solution will depend upon the known properties of the disinfectant employed. A particularly effective general disinfectant, which will destroy most organisms including those responsible for "Athlete's foot," is a solution of chlorine in water, which decomposes on standing to form additionally hypochlorous and hydrochloric acids. The concentration of the chlorine is not critical. The proper proportions may readily be determined by those skilled in the art. Another very suitable disinfectant, particularly effective against "Athlete's foot," is an aqueous solution of formaldehyde of suitable concentration, as, for instance, 4%.

The emulsion may be formed in any known manner, as, for instance, by beating together the desired proportions of oil and aqueous solution. Small amounts of any of the known emulsifying agents, such as protective colloids, as, for instance, albumin or gum arabic, soaps, ethanol amines, sulfates or sulfonates of the higher aliphatic alcohols, such as sodium lauryl sulfate or its homologues, or other substances containing both oil and water soluble groups in their molecules, may be added to insure stability of the emulsion. The proportions of oil and aqueous solution are not critical. If desired, various essential oils, such as various terpenes, may be added, singly or in admixture, to the emulsion, to give a pleasant odor to both the treating composition and the treated shoes. These substances are preferably added prior to emulsification although they may be added later if desired.

One specific example of the composition may be prepared by emulsifying about equal volumes of "soluble oil" and a water solution of chlorine containing about 500 cc. of chlorine per liter of water. Emulsification may be accomplished in the presence of about one per cent of an emulsifying agent, such as a sodium soap, for instance, sodium laurate. Sodium lauryl sulfate may be used if desired.

The emulsion may be applied to the leather in any suitable manner. For example, it may merely be coated on the surface of the leather and allowed to be absorbed. However, for the destruction of more stubborn organisms, such as those responsible for "Athlete's foot," it is preferably applied by means of an absorbent material which is kept in contact with the leather for extended periods of time. In the treatment of shoes, an absorbent pad shaped to fit the interior of the shoe may be moistened with the emulsion, placed inside the shoe, and left there for a sufficient period of time to enable the pores of the leather to become completely saturated, for instance, overnight.

When the emulsion is applied to the leather, the oil phase is absorbed by the leather. The oil in itself acts to discourage the organisms. Further, it repels the water phase and protects the leather from the otherwise harmful action of the water and its contained disinfectant. The disinfectant water phase acts to destroy the infectious organisms on the cloth lining of the shoe and at or near the surface of the leather. Thus an effective disinfection of the shoe is obtained without harmful effect on the leather of the shoe. Such harmful effects of the aqueous solution include the cracking of the leather and provide a suitable environment for the anaerobic fungi. However, the oil phase preserves the leather and prevents the cracking or other deterioration.

In place of chlorine or formaldehyde, other water soluble disinfectants may be employed, e. g. phenol, hexylresorcinol, etc., in suitable concentration. Additionally an oil-soluble disinfectant may be added to the oil phase of the emulsion, e. g. a naphthenic acid, benzoin, naphthenic acid salts of copper or aluminum, in suitable amounts, such as between .5 and 5% of the oil. Thus the pores and sub-surface of the leather will be additionally disinfected.

Certain variations of the invention disclosed will be apparent to those skilled in the art and are intended to be included within the scope of the appended claims.

What is claimed is:

1. In the process of disinfecting shoes made essentially of leather and the like porous materials against anaerobic fungi, the step including treating said shoes with an emulsion comprising a non-drying emulsifiable oil, water, and a water-soluble substance capable of destroying said anaerobic fungi.

2. The process of treating shoes made essentially of leather and the like porous materials which consists of applying an emulsion comprising an emulsifiable oil and a water solution of a water soluble disinfectant substance to at least the interior portion of the shoes, causing the emulsion to break, disinfecting at least the interior portion of the shoes by means of the water soluble disinfectant substance and causing the oil to penetrate the leather and fabric to prevent deterioration thereof.

3. In the process of disinfecting shoes made essentially of leather and the like porous materials against anaerobic fungi, the step including treating said shoes with an emulsion comprising a non-drying emulsifiable oil, water, and an oil-soluble substance capable of destroying said anaerobic fungi.

4. In the process of disinfecting shoes made essentially of leather and the like porous materials against anaerobic fungi, the step including treating said shoes with an emulsion comprising a non-drying emulsifiable oil, water, a water-soluble substance, and an oil-soluble substance, each of said substances being capable of destroying said anaerobic fungi.

5. A composition of matter primarily adapted for disinfecting the interior and porous surfaces of shoes made essentially of leather and the like, which consists of an emulsion, one phase of which comprises an oil which is characterized by being readily emulsifiable, readily absorbed by leather and when absorbed by leather by having the qualities of softening the leather and protecting it against the deleterious effects of moisture, the other phase of which comprises a water solution of a water-soluble disinfectant substance, the said disinfectant substance being characterized by having the power to inhibit and destroy the anaerobic organisms responsible for "athlete's foot."

6. A composition of matter as defined in claim 5 in which the said emulsifiable oil contains in solution an oil-soluble disinfectant substance which is further characterized by having the power to inhibit and destroy the anaerobic organisms responsible for "athlete's foot."

7. A composition of matter as defined in claim 5 in which the said emulsifiable oil contains benzoin in solution.

8. A composition of matter as defined in claim 5 in which the water-soluble disinfectant substance is chlorine.

9. A composition of matter as defined in claim 5 in which the water-soluble disinfectant substance is formaldehyde.

10. A composition of matter as defined in claim 5 in which the water-soluble disinfectant substance is hexylresorcinol.

11. A composition of matter as defined in claim 5 in which the said emulsifiable oil contains in solution an oil-soluble disinfectant substance which is further characterized by having the power to inhibit and destroy the anaerobic organisms responsible for "athlete's foot" and in which the water-soluble disinfectant substance is chlorine.

12. A composition of matter as defined in claim 5 in which the said emulsifiable oil contains benzoin in solution and in which the benzoin is employed in amounts of about 0.5–5.0% of the oil.

13. A composition of matter as defined in claim 5 in which the water-soluble disinfectant is chlorine and in which the chlorine is employed in an amount of about 500 cc. of chlorine per liter of water.

14. A composition of matter as defined in claim 5 in which the water-soluble disinfectant is chlorine, said chlorine being employed in an amount of about 500 cc. of chlorine per liter of water and said oil and water phases being present in about equal amounts by volume.

15. A composition of matter as defined in claim 5 in which the water-soluble disinfectant substance is formaldehyde and in which the formaldehyde is employed in an amount of about 4% of the water.

16. A composition of matter as defined in claim 5 in which the said emulsifiable oil contains in solution an oil-soluble disinfectant substance which is further characterized by having the power to inhibit and destroy the anaerobic organisms responsible for "athlete's foot" and in which the water-soluble disinfectant substance is chlorine, said chlorine being employed in an amount of about 500 cc. of chlorine per liter of water.

EDWARD B. BEALE.